United States Patent [19]

Golley

[11] Patent Number: 4,897,010

[45] Date of Patent: Jan. 30, 1990

[54] HAY BALE HANDLING IMPLEMENT

[76] Inventor: James Golley, R.R. #1, Tees, Alberta, Canada

[21] Appl. No.: 190,527

[22] Filed: May 5, 1988

[51] Int. Cl.⁴ .................. B65H 16/10; B66F 09/18; E02F 03/36

[52] U.S. Cl. .................. 414/24.6; 414/607; 414/724

[58] Field of Search .............. 414/24.5, 24.6, 721, 414/724, 607; 294/61, 120, 125

[56] References Cited

U.S. PATENT DOCUMENTS

| | | | |
|---|---|---|---|
| 1,169,917 | 2/1916 | Blackstone | 294/125 X |
| 3,249,245 | 5/1966 | Foster | 414/724 |
| 3,795,331 | 3/1974 | Guest | 414/724 X |
| 3,921,837 | 11/1975 | Vandewater | 414/24.5 |
| 3,958,772 | 5/1976 | Hynson | 414/24.6 X |
| 3,968,940 | 7/1976 | Godbersen | 242/86.5 R |
| 4,040,531 | 8/1977 | Cross | 414/24.5 |
| 4,053,069 | 10/1977 | Love | 414/24.5 |
| 4,084,707 | 4/1978 | McFarland | 414/24.6 |
| 4,095,706 | 6/1978 | Schwien et al. | 414/24.6 |
| 4,120,405 | 10/1978 | Jones et al. | 414/24.5 |
| 4,242,035 | 12/1980 | Hornstein | 414/724 |
| 4,280,777 | 7/1981 | Gray | 414/24.6 |
| 4,329,103 | 5/1982 | Miller | 414/24.5 |
| 4,514,127 | 4/1985 | Maier | 414/24.6 |
| 4,518,299 | 5/1985 | Vanderlei | 414/24.6 |
| 4,538,948 | 9/1985 | Melton | 414/24.6 |
| 4,648,769 | 3/1987 | Stirling | 414/24.6 |
| 4,674,786 | 6/1987 | Lynch | 294/120 |

FOREIGN PATENT DOCUMENTS

| | | | |
|---|---|---|---|
| 2836246 | 3/1980 | Fed. Rep. of Germany | 414/24.6 |
| 2513484 | 4/1983 | France | 414/24.6 |
| WO/83/01175 | 4/1983 | World Int. Prop. O. | 414/24.6 |

Primary Examiner—Robert J. Spar
Assistant Examiner—Janice Krizek
Attorney, Agent, or Firm—Ostrolenk, Faber, Gerb & Soffen

[57] ABSTRACT

A hay bale handling implement is provided and includes a support frame for releasably coupling the implement to a vehicle. A plurality of elongate cylindrical spears project forwardly from the frame and are spaced about an axis of for securing releasably a hay bale so that it may be lifted and moved to a desired location. An actuator is also included for rotating the elongate spears about the axis to allow the hay bale to be rotated when engaged with the spears.

16 Claims, 3 Drawing Sheets

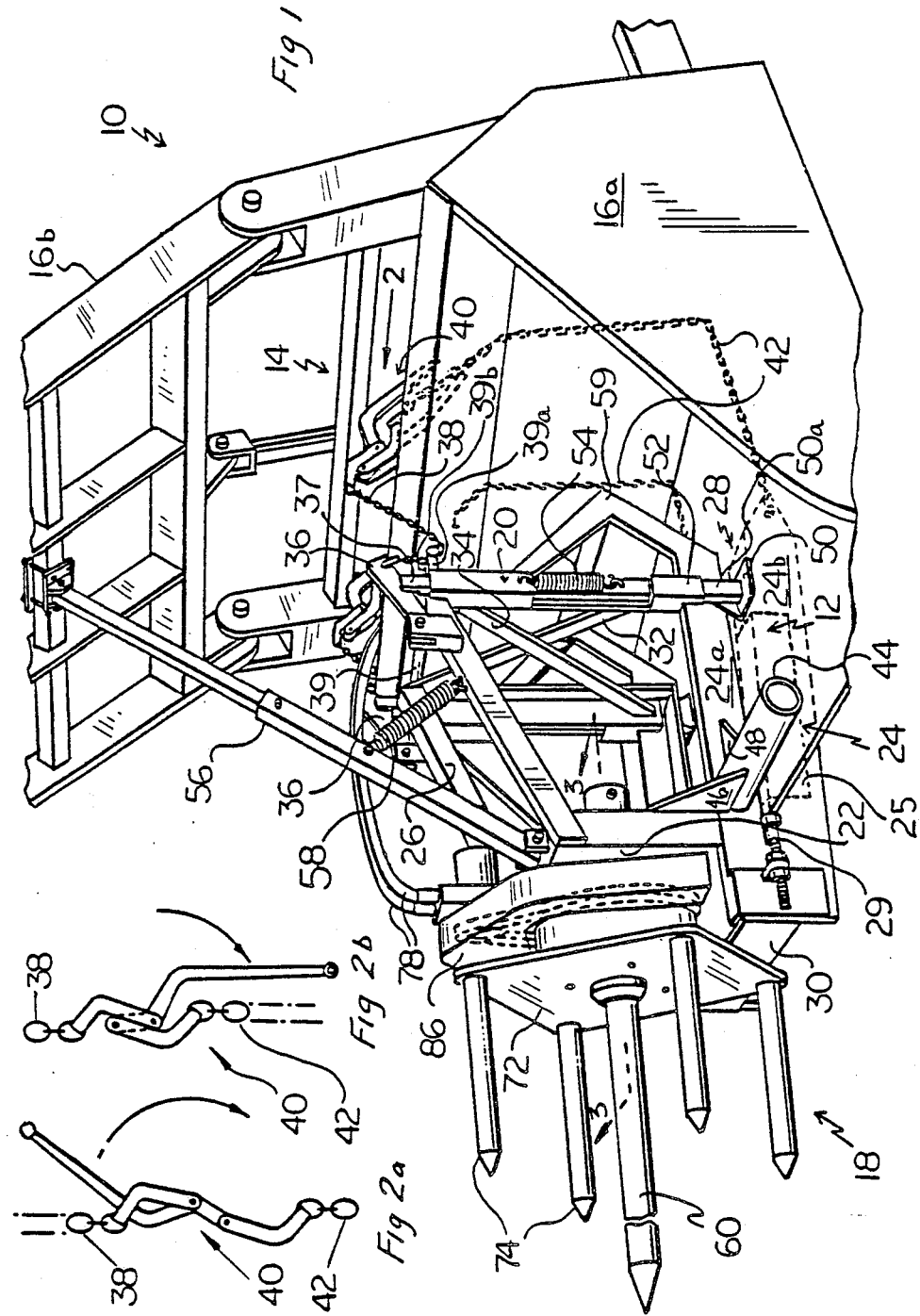

HAY BALE HANDLING IMPLEMENT

The present invention relates to a hay bale handling implement for use with a vehicle.

Many hay bale handling devices have been devised for engagement with a motor vehicle to assist in moving large hay bales, i.e. those formed by rolling rather than cutting or packing. In particular, U.S. Pat. No. 4,095,706 to Schwien et al shows a rolled bale handling apparatus adapted to be connected to a trailer hitch and operable to move large hay bales. The device comprises an A-frame assembly supported on an axle. A pair of opposed spike and plate arrangements for engaging opposite ends of the hay bale are pivotally connected to the diverging ends of the A-frame. Support rods connected to the arrangements, extend inwardly at right angles to the A-frame and are connected together at their inwardly extending ends by a chain. Coupled to the chain is a second chain which extends towards the apex of the A-frame assembly wherein it is wound around a winding spool.

When it is desired to lift a hay bale, the trailer is positioned so that the diverging ends of the A-frame straddle the hay bale. The winding spool is then turned to wind the second chain therearound. This causes the first chain to pull the support rods into alignment so that they are parallel to the axle and in turn causes the spike and plate arrangements to engage the hay bale securely at either ends. By winding the chain further around the winding spool, the chain forces the support rods to pivot downwardly thereby lifting the hay bale from the ground and supporting it on the trailer axle.

However, when the hay bale is engaged with the handling device, the hay bale cannot be unrolled without driving the vehicle. Furthermore, the handling device must be positioned so that the diverging ends of the A-frame assembly straddle the hay bale if it is to be handled. Thus, in confined areas, the hay bales cannot be unrolled or engaged with this handling apparatus.

Attempts have been made to overcome the problem of using a trailer for moving the hay bales. In particular, U.S. Pat. No. 4,514,127 to Maier shows a hay bale lifting and unrolling device for mounting to the front end of a tractor. The device comprises a number of prongs which are driven into the hay bale, thereby allowing the tractor to lift the hay bale and move it to its desired position. When it is desired to unroll the hay bale using the device, one of the prongs is engaged axially with the hay bale. The tractor is then driven forward to one side, to move the hay bale and the prong through approximately 90° so that the axis of the hay bale is perpendicular to the direction of travel of the tractor. With the prong and hay bale in this position, the hay bale can be unrolled by driving the tractor since the direction of travel of the tractor is perpendicular to the axis of the hay bale.

However, the same problem still exists in that in order to unroll the hay bale, driving of the tractor is required. Thus, in confined areas where the tractor is unable to be driven to one side of the hay bale and then forward to unroll the hay bale, the Maier hay bale device is not capable of functioning properly to unroll the hay bale. Accordingly, there is a need for an improved hay bale handling implement.

It is therefore an object of the present invention to obviate or mitigate the above disadvantages by providing a novel hay bale handling implement.

According to the present invention there is provided a hay bale handling implement for attachment to a vehicle comprising:
a support frame having an attachment means for releasably attaching said frame to said vehicle;
engagement means including a plurality of elongate members projecting forwardly from said frame and being spaced about a substantially horizontal axis, said elongate members being outwardly inclined with respect to said axis and being for piercing to secure releasably a hay bale; and
actuation means for rotating said engagement means about said axis to allow a hay bale to be rotated whilst being supported on said elongate members.

Preferably, the engagement means includes a rotatable support plate for supporting one end of the elongate members. Also, it is preferred that the elongate members are formed from cylindrical-shaped spikes radially disposed about the support plate and that the apparatus further includes a central cylindrical spike which projects beyond the elongate members and is positioned on the axis.

It is also preferred that the attachment means includes a pair of bifurcated supports located on either side of the support frame at the bottom thereof for receiving the bottom plate of the shovel of a front loader, and further includes a pair of chain couplings for surrounding the shovel to secure the hay bale handling implement, to the shovel.

Furthermore, it is preferred that the actuation means comprises a bi-directional hydraulic motor connected to the support plate by a chain and gear drive.

The provision of the actuation means provides the advantage of allowing an engaged hay bale to be rotated when the vehicle is stationary. This permits a large hay bale to be unrolled in an area which is not large enough to permit driving of the vehicle, but is sufficient in size to allow entrance of the vehicle or at least the forwardly extending elongate members.

In another aspect of the present invention, there is provided an implement adapted to be coupled to the loader bucket of a front-end loader, said loader bucket including a lower support platform, said implement comprising:
a support frame for resting on said support platform and having a front end and a rear end;
coupling means connected to said frame and extending around said bucket to secure releasably said frame to said bucket;
biasing means for biasing the rear end of said support frame towards said support platform upon tightening of said coupling means; and
engagement means extending forwardly from said front end.

In still yet another aspect of the present invention there is provided a hay bale handling implement adapted to be coupled to the loader bucket of a front-end loader, said loader bucket including a lower support platform, said implement comprising:
a support frame having an attachment means for releasably attaching said frame to said bucket;
engagement means including a plurality of elongate members projecting forwardly from said frame and being spaced about an axis extending substantially parallel to said members, said members being for piercing to secure releasably a hay bale;
actuation means for rotating said engagement means about said axis to allow a hay bale to be rotated whilst supported on said members, said attachment means including coupling means connected to said frame and extending around said bucket to secure releasably said frame to said bucket; and biasing means for biasing the rear end of said support frame towards said platform upon tightening of said coupling means.

Embodiments of the present invention will now be described by way of example only with reference to the accompany drawings in which:

FIG. 1 is a perspective view of a hay bale handling implement coupled to a front end loader;

FIGS. 2a and 2b are side views of a portion of the device illustrated in FIG. 1 in open and closed positions respectively;

Figure 3:
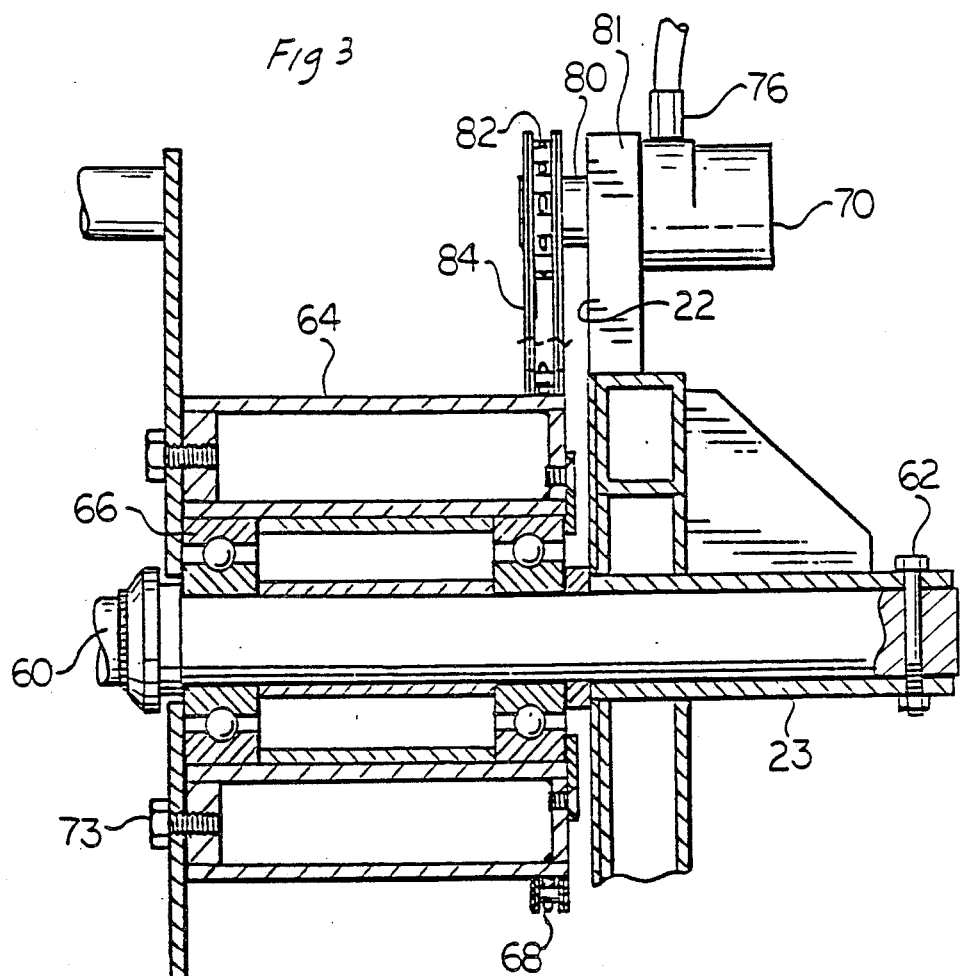
FIG. 3 is a sectional view of a portion of the device illustrated in FIG. 1 taken along line 3—3.
Figure 4:
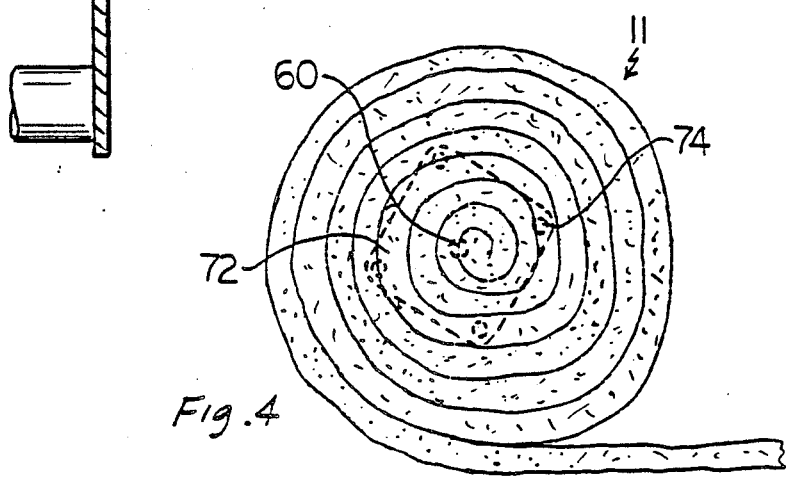
FIG. 4 is a sectional view of a portion of the device illustrated in FIG. 1 engaged with a hay bale.

Referring to the Figures, a hay bale handling implement 10 for lifting and unrolling hay bales 11 is shown. The implement includes a frame structure 12 supporting an attachment section 14 for securing the implement to the shovel 16a and the frame 16b of a front end loader (not shown). The frame structure 12 also supports an engagement section 18 for securing the hay bales 11 to be lifted and unrolled.

The frame structure 12 comprises a pair of upwardly extending back frame members 20 and a front plate 22, that define rearward and forward ends respectfully. The front plate 22 is provided with a central bore which is surrounded by a tubular sleeve 23 fastened to the rearward side of the plate 22. The back frame members 20 and the front plate 22 are connected at their lower ends to the top arm 24a of a bifurcated support 24. Support beams 26 connect the upper end of the back frame members 20 to the upper ends of the front plate 22. The bifurcated supports 24 provide recesses 28 at the rearward end of the frame 18 for allowing the lower plate of the shovel 16a to pass. Filler plates 25 are removably attachable to the lower arms 24b of the supports 24 to allow the recesses 28 to accommodate lower plates of shovels 16a having different thicknesses.

Bolts 29 are threadably engaged with the forward ends of the supports 24 and extend into the recesses 28 to provide abutment surfaces for the lower plate. The distance that the bolts 29 extend into the recesses is adjustable, thereby limiting the movement of the shovel 16a into the recesses 28. A front plate 30 interconnects the front ends of the supports 24 and provides support for the frame structure 12. Crossbars 32 and 34 are connected between each of the back frame members 20 in order to provide additional support for the frame structure 12.

Levers 36 are pivotally mounted to the support beams 26 and extend upwardly from each back frame member 20 beyond the upper edge of the shovel 16a. Supports 37 are provided to support the levers 36. The levers 36 have holes for receiving one end of a chain 38. A chain support 39 extends rearwardly from the frame structure 12 and is coupled at either ends to the frame members 20 by a pair of stubs 39a and 39b. The chains 38 pass between the passages defined by the chain support and the two pair of stubs and are secured at their other ends to overcentre couplings 40. The passage prevent lateral movement of the chains 38 with respect to the implement 10 when in use, thereby preventing bending of the levers 36. The lower arms 24b of the supports 24 are also provided with a hole for receiving one end of a second chain 42. The chains 42 extend around the outer surface of the shovel 16a and are releasably engaged with the respective overcentre coupling 40 to attach securely the implement 10 to the shovel 16a of the front end loader and to prevent the shovel from being removed from the recesses 28.

The frame structure 18 is also provided with additional support to reduce the implement 10 from tilting. To provide this additional support, a pair of cylindrical support tubes 44 extend outwardly from the forward end of the top arms 24a and rest on the upper surface of the lower plate of the shovel 16a. The support tubes 44 are fastened securely to the supports 24 by fillets 46 and 48 respectively.

A pair of feet 50 having legs 50a provide stability for the rearward end of the frame structure 12. The feet 50 extend along side the frame members 20 and are slidably supported in brackets 52. Springs 54 are also included and connected between the upper end of the legs 50a and lower end of the lever supports 37. A telescopic support strut 56 extends upwardly between the top of front plate 22 and the frame 16b of the shovel to hold the frame in an elevated position. A spring 58 is coupled between one of the support beams 26 and the strut 56. A structure 59 is also coupled across the back frame members 20 and extends outwardly therefrom. The structure 59 generally conforms with the profile of the shovel is used to aid in coupling the implement 10 to the shovel 16a.

The engagement means 18 comprises a main elongate cylindrical spear 60 which extends through the central bore provided in the front plate 22 and is secured to the tubular sleeve 23 by a bolt 62. A cylindrical outer hub 64 is rotatably supported on the spear 60 by a greased sleeve 66, the hub and the sleeve of which are rotatable about the spear 60. A gear wheel 68 is integrally formed with the outer surface of the hub 64.

A diamond-shaped support plate 72 is removably connected to the forward end of the cylindrical hub 64 by a plurality of bolts 73 and allows the spear 60 to pass so that it extends forwardly from the frame structure 12. A plurality of elongate cylindrical spears 74 also extend outwardly from the support plate 72. Each of the spears 74 is smaller in length than the main spear 60 and is rotatable about the centre spear 60 when the cylindrical hub 64 is rotated.

A motor 70 is secured to the top of the front plate 22 and includes a pair of hose connectors 76 receiving hoses 78. The hoses 78 are also engaged with a hydraulic fluid source (not shown) which provides the fluid required to permit bi-directional rotation of the motor 70. The motor 70 includes a drive shaft 80 extending from a housing 81 and driven in either direction depending on which hose 78 is supplying the fluid. The operation of the motor 70 is believed to be well known in the art and hence will not be described in detail herein. A second gear wheel 82 is coupled to the outer end of the drive shaft and is aligned with the gear wheel 68 formed on the cylindrical hub 64. A drive chain 84 mates with the gear wheels 82 and 68, thereby translating the rotational motion of the drive shaft 80 to the support plate 72 and hence, to the cylindrical spears 74. A protective housing 86 is also provided to cover the drive shaft 80, the gear wheels 68 and 82 and drive chain 84.

To connect the hay bale implement 10 to a front end loader, the bottom surface of the shovel 16a is inserted in the recesses 28 of the bifurcated supports 24 until its front end abuts against the ends of the adjustable bolts 29 and the cylindrical support tubes 44 and support feet 50 to rest on the shovel surface. Thereafter, the chains 42 are looped around the outer surface of the shovel and connected to the overcentre couplings 40. The overcentre couplings 40 are then tightened as illustrated in FIG. 2b, thereby pulling the chains 38 and 42 towards one another and in turn forcing the levers 36 against the lever supports 37. The force exerted by the levers 36 on the lever supports forces the frame structure 12 towards the lower plate of the shovel. The downward force causes the back frame members 20 to slide downwardly along the legs 50a via the brackets 52, thereby compressing the springs 54. This forces the feet 50 into tight engagement with the shovel plate surface due to the force of the springs 54 acting against the compression. This locking action prevents the implement 10 from sliding along the shovel when it is engaged.

When the overcentre couplings 40 are released, the downward force exerted on the frame structure 12 by the levers 36 is eliminated, thereby allowing the springs 54 to expand and in turn releasing the secure engagement of the feet 50 with the shovel plate. Thereafter, the telescopic support strut 56 is rotated into proper position and coupled to the frame 16b and the hoses 78 are connected to the fluid source to complete the coupling of the implement 10 to the vehicle.

In operation, when the hay bale handling implement 10 is properly attached to the front end loader and it is desired to carry a hay bale, the loader is driven towards the large hay bale 11 so that the main spear 60 and the elongate spears 74 pierce the hay bale 11. With the spears secured to the hay bale, the hay bale 11 can be lifted by raising the shovel 16a of the front end loader. When this is complete, the hay bale 11 may be lifted and carried to its desired location. If it is desired to rotate the hay bale 11, the operator 10 supplies fluid into the appropriate actuator hose 78, thereby causing the motor 70 to rotate the drive shaft 80 in the desired direction. The rotation of the drive shaft 80 in turn rotates the gear and chain drive mechanism. This causes the cylindrical hub 64 to be rotated providing the rotation for the support plate 72 and smaller spears 74. Thus, the hay bale 11 can be rotated without driving of the front end loader. This feature is advantageous, since the hay bales can be unrolled using the implement 10 in confined areas where driving of the front end loader is not possible.

Figure 5:
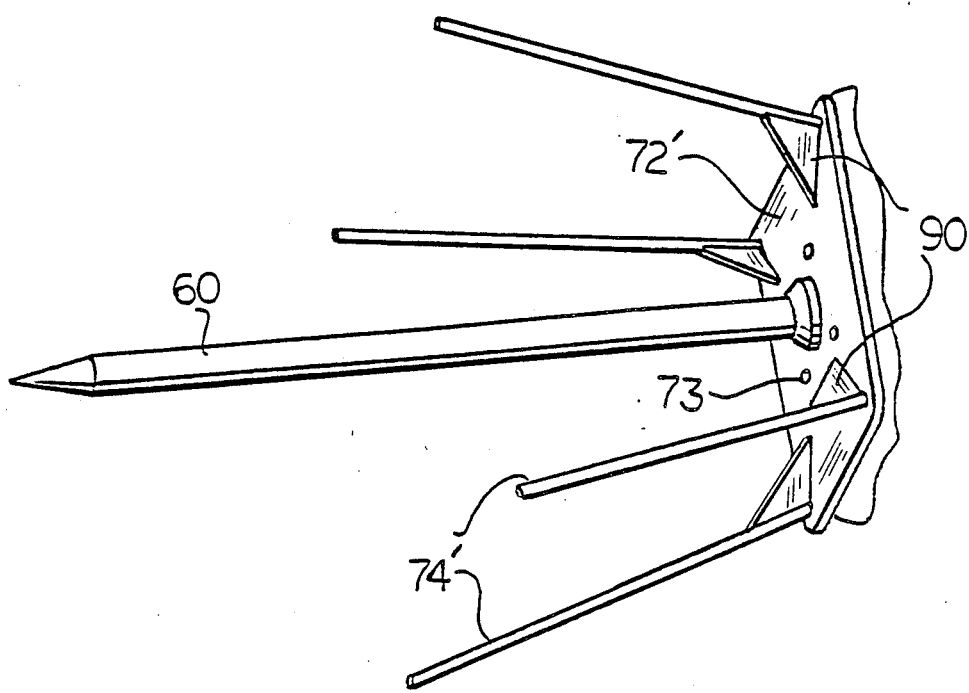
FIG. 5 is a perspective view of another embodiment of a portion of the device illustrated in FIG. 1.

Referring to FIG. 5, an alternative embodiment of a portion of the engagement section 18 is shown for use when lifting soft-centred hay bales. In this embodiment, like reference numerals will be used to indicate like components with a "'" added for clarity. Similar to the previous embodiment, the engagement section 18 includes a support plate 72' capable of being connected to the cylindrical hub 64' via bolts 73'. The plate 72' is similarly provided with a central bore for allowing the centre spear 60 to pass therethrough. A plurality of elongate spears 74' extend outwardly from the plate 72' and are spaced about the centre spear 60. The elongate spears 74' are also supported on the plate 72' by fillets 90. The elongate spears 74' are longer in length than the spears 74 of the previous embodiment and are outwardly inclined with respect to the centre spear 60. The increased length of the spears 74' is needed to prevent the soft-centred hay bales from sliding about the spears when engaged with the implement by providing increased support. Furthermore, the inclined spears 74' provide improved handling when lifting the soft-centred hay bales.

It should be noted that although the present device is described for use with a front end loader, the implement can be modified to allow it to be coupled easily to a number of other vehicles. Furthermore, the engagement means can implement various shaped spears for piercing the hay bales. Also, although the implement has been described as being hydraulically actuated, the present device is also capable of using other types of bi-directional actuators to facilitate rotation of the engagement means.

I claim:

1. A hay bale including implement adapted to be coupled to the loader bucket of a front-end loader, said loader bucket including a lower support platform, said implement comprising:

a support frame for resting on said support platform and having a front end and a rear end;

engagement means including a plurality of elongate members projecting forwardly from said support frame and being spaced about an axis extending substantially parallel to said elongate members, said elongate members for piercing to secure releasably a hay bale;

actuation means for rotating said engagement means about said axis to allow said hay bale to be rotated while supported on said elongate members;

attachment means including coupling means connected to said support frame and extending around said bucket to secure releasably said support frame to said bucket; and biasing means for biasing the rear end of said support frame towards said platform upon tightening of said coupling means wherein said support frame is a generally upright structure including a pair of bifurcated support members secured to the bottom of said support frame for receiving said support platform and wherein said coupling means comprises a pair of chain couplings extending around said platform, one end of said chain couplings being connected to the lower end of said support members and the other end of said chain couplings being releasably coupled to the top of said support frame, said attachment means further comprising support feet slidably mounted to said support frame at the rear end thereof for resting on said support platform and being biased theretowards via springs upon tightening of said chain couplings thereby constituting said biasing means.

2. The hay bale handling implement as defined in claim 1 wherein said engagement means includes a rotatable support plate for supporting said elongate members; and a main elongate member projecting outwardly along said axis, said elongate members being equally and circumferentially spaced about said main elongate member.

3. The hay bale handling implement as defined in claim 2 wherein said main elongate member passes through said support plate and is secured to said support frame, said support plate being rotated about said main elongate member.

4. The hay bale handling implement as defined in claim 3 wherein said main elongate member and said elongate members are cylindrical spears.

5. The hay bale handling implement as defined in claim 4 wherein said actuation means includes a bi-directional motor having a rotating drive shaft for rotating said support plate.

6. The hay bale handling implement as defined in claim 5 wherein said bi-directional motor is hydraulically actuated and further includes a chain and gear drive for translating the rotation of said shaft to said support plate.

7. The hay bale handling implement as defined in claim 6 further comprising a housing for covering said drive shaft and said chain and gear drive.

8. The hay bale handling implement as defined in claim 1 wherein said attachment means further comprises additional support members extending from said support frame for resting on said support platform and positioned to extend substantially perpendicular to said axis to prevent tipping of said support frame.

9. The hay bale handling implement as defined in claim 1 further comprising chain guides mounted on said rear end, said chain guides preventing said chain couplings from sliding laterally along said bucket.

10. The hay bale handling implement as defined in claim 9 further comprising a boom member pivotally mounted at one end to the front end of said upright structure and being adapted to be removeably connected to said front-end loader at the other end thereof.

11. The implement as defined in claim 1 wherein said elongate members are outwardly inclined with respect to said axis.

12. An implement adapted to be coupled to the loader bucket of a front-end loader, said loader bucket including a lower support platform, said implement comprising:
   a support frame for resting on said support platform and having a front end and a rear end;
   coupling means connected to said support frame and extending around said bucket to secure releasably said support frame to said bucket;
   biasing means for biasing the rear end of said support frame towards said support platform upon tightening of said coupling means; and
   engagement means extending forwardly from said front end, wherein said support frame is a generally upright structure having a pair of lower base members, said base members including a bifurcated front end for receiving said support platform, one end of said coupling means being connected to said base members beneath said support platform and wherein said rear end includes a pair of feet, said feet being biased towards said support platform via springs upon tightening of said coupling means.

13. The implement as defined in claim 12 further comprising a boom member pivotally mounted at one end thereof to the front end of said upright structure and being adapted to be removably connected to said front-end loader at the other end thereof.

14. The implement as defined in claim 12 wherein said coupling means comprises a pair of chains, each of said chains having an over-centre coupling operable to tighten said chain around said bucket.

15. The implement as defined in claim 14 further comprising chain guides mounted on said rear end, said chain guides preventing said chains from sliding laterally along said bucket.

16. The implement as defined in claim 12 wherein said engagement means comprises a plurality of elongate spears projecting from said front end, said spears for piercing a hay bale to engage releasably the same.

* * * * *